(12) United States Patent
Starner

(10) Patent No.: US 6,783,743 B1
(45) Date of Patent: Aug. 31, 2004

(54) APPARATUS AND METHOD FOR ABSORBING AND RECYCLING MATERIAL IN A BLENDER

(75) Inventor: Thomas C. Starner, Nazareth, PA (US)

(73) Assignee: Puritan Products, Inc., Bethelem, PA (US)

( * ) Notice: Subject to any disclaimer, the term of this patent is extended or adjusted under 35 U.S.C. 154(b) by 0 days.

(21) Appl. No.: 09/521,748

(22) Filed: Mar. 9, 2000

(51) Int. Cl.$^7$ ................................. B01J 8/08; B01J 4/00
(52) U.S. Cl. ................... 422/224; 422/189; 422/229; 422/233; 422/261; 366/156.1; 366/183.1
(58) Field of Search .................. 366/183.1, 139, 366/156.1; 422/109, 188–190, 198, 211–213, 215, 219, 224–225, 229, 232, 261, 280, 288

(56) References Cited

U.S. PATENT DOCUMENTS

| | | | | |
|---|---|---|---|---|
| 3,954,426 A | * | 5/1976 | Brange | 95/280 |
| 4,615,647 A | * | 10/1986 | Lukacz | 406/60 |
| 4,636,085 A | * | 1/1987 | Kopernicky | 366/76.9 |
| 4,889,452 A | * | 12/1989 | Heyl | 406/85 |
| 4,952,302 A | * | 8/1990 | Leach | 208/85 |
| 5,348,390 A | * | 9/1994 | Schertenleib | 366/136 |

* cited by examiner

*Primary Examiner*—Hien Tran
*Assistant Examiner*—Jennifer A. Leung
(74) *Attorney, Agent, or Firm*—John Lezdey

(57) ABSTRACT

An apparatus and method for blending a solute and a solvent to form a solution product which substantially eliminates starting material and product operational loss while improving environmental safety both in the workplace and the ambient atmosphere. The apparatus and method employ a closed system and controls which remove substances from the overhead vapors generated in the various units by employing separate and distinct filtering systems. A high efficiency particulate air filter (HEPA) is employed in a closed solute supply means. A demister device is in fluid communication with the vent of the mixing vessel unit to remove solvent and solution products, to form droplets from the exhaust stream and return them to the mixing tank and discharging the exhaust stream without stress to the environment.

10 Claims, 3 Drawing Sheets

APPARATUS AND METHOD FOR ABSORBING AND RECYCLING MATERIAL IN A BLENDER

BACKGROUND FOR THE INVENTION

1. Field of the Invention

The present invention relates to an apparatus and a method for adsorbing and recycling material in a blending operation. More particularly, the apparatus and method relates to adsorbing and recycling hazardous materials during blending operations.

2. Description of the Prior Art

In the production of many articles of commerce, toxic material are important intermediates for compositions useful in agriculture and in a wide variety of manufacturing industries, For example, the solution of catechol (1,2-dihydroxybenzene) in monoethanolamine (2-aminoethano) is utilized for removing photoresists from printed circuit boards. Catechol is corrosive and toxic, and a particular caution is required in handling because it can be readily absorbed through the skin. Further, the vapor of catechol can also affect the eyes and mucous membranes. Likely, overexposure to monoethanolamine effects the respiratory system, and can cause problems to the skin and cause eye irritation. In order to avoid the above-mentioned problems, when it is in the proximate environment safety equipment must be used, i.e., face shield, gloves and a vapor impervious apron of a "HAZMAT" suit, Thus, a need exists for an improved, efficiently simple and cost effective method and apparatus for blending toxic materials. Particularly an apparatus and method that are sufficiently fast to be capable of handling, especially thermally sensitive and/or toxic is quite apparent. The need is met by a process and apparatus as disclosed herein which generally improves upon the prior art techniques described above.

SUMMARY OF THE INVENTION

Generally stated, the present invention improves upon a blending operation in which components and product loss are substantially eliminated by recovering materials from various units of the apparatus, and recycling the materials back to the respective units. More particularly, the method and apparatus of this invention are directed to the mixing of toxic materials wherein the recovery/recycling operation have the inherent benefits of reducing the hazardous conditions in the workplace and of allowing the exhaust streams from the various units to be discharged into the atmosphere well within the limits of federal and state statutes. The method and apparatus are most particularly useful in blending toxic materials when the dissolving process is exothermic. It follows that in an exothermic system more volatiles are suspended in the exhaust stream. The method of the invention in its broadest aspect is achieved by a blending operation, which comprises the steps of:

a.) introducing a solvent into a closed mixing vessel having at least one vent in fluid communication with at least one demister device;
b.) agitating said solvent;
c.) charging a solute into said solvent;
d.) dissolving said solute into said solvent to form a solute product and vapor entraining both solvent and solution product;
e.) exhausting said vapor from the mixing vessel to said demister device f.) passing said vapor through said demister device removing the entrained substances from the vapor, forming droplets and returning the droplets back to said mixing vessel;
g.) discharging the treated vapor to the atmosphere; and
h.) transferring solution product from the mixing vessel.

In accordance with an apparatus aspect of the present invention said apparatus comprises:

a.) a closed conveyor conduit assembly for supplying a solute which includes a hopper device in combination with a helical conveyor, said hopper device having a chamber including a blower assembly mounted within said chamber, a removably attached high efficiency particulate air filter, and an outlet which is connected with a hopper vent, said filter being operatively connected to the blower assembly, a first vent means in fluid communication with an exhaust to the atmosphere, a closed vessel for holding and mixing solvent having a inlet means for introducing solvent into said vessel, a mixing means, an outlet means for discharging solution product, and a demister device in fluid communication with said second vent means.

It is, therefore, an object of this invention to provide an improved method and apparatus for blending solute-solvent systems, which increases the efficiency of the operation by substantially eliminating starting material and product loss, and reducing capital expenditures and operating expenses.

It is another object of this invention to provide an improved method and apparatus for blending toxic materials by removing harmful substances from the blending units making the workplace safer.

A further object of this invention is to provide an improved method and apparatus for blending toxic materials which substantially eliminates starting material and product loss, as well as, provides efficient removal of harmful vapors exhausted from the blending process which may be discharged to the atmosphere without stress to the environment.

Yet another object of this invention is to provide an improved method and apparatus for safely and efficiently blending toxic materials, improved safety throughout the moving environment and increased productivity without a large expenditure of capital.

It is still a further object of this invention to provide a method and apparatus, which is more easily operated and maintained.

Another object of the invention is to provide an improved method and apparatus for the blending of catechol and monoethanolamine and for removing efficiently and economically harmful materials from the vapors exhausted from the blending procedure.

Additional objects, advantages and novel features of the invention will be set forth in part in the description which follows, and in part, will become apparent to those skilled in the art upon examination of the following or may be learned by the practice of the invention. The objects and advantages of the invention may be realized and obtained by means of the instrumentalities and combinations particularly pointed out in the appended claims.

DETAILED DESCRIPTION OF THE PREFERRED EMBODIMENT

Figure 1:
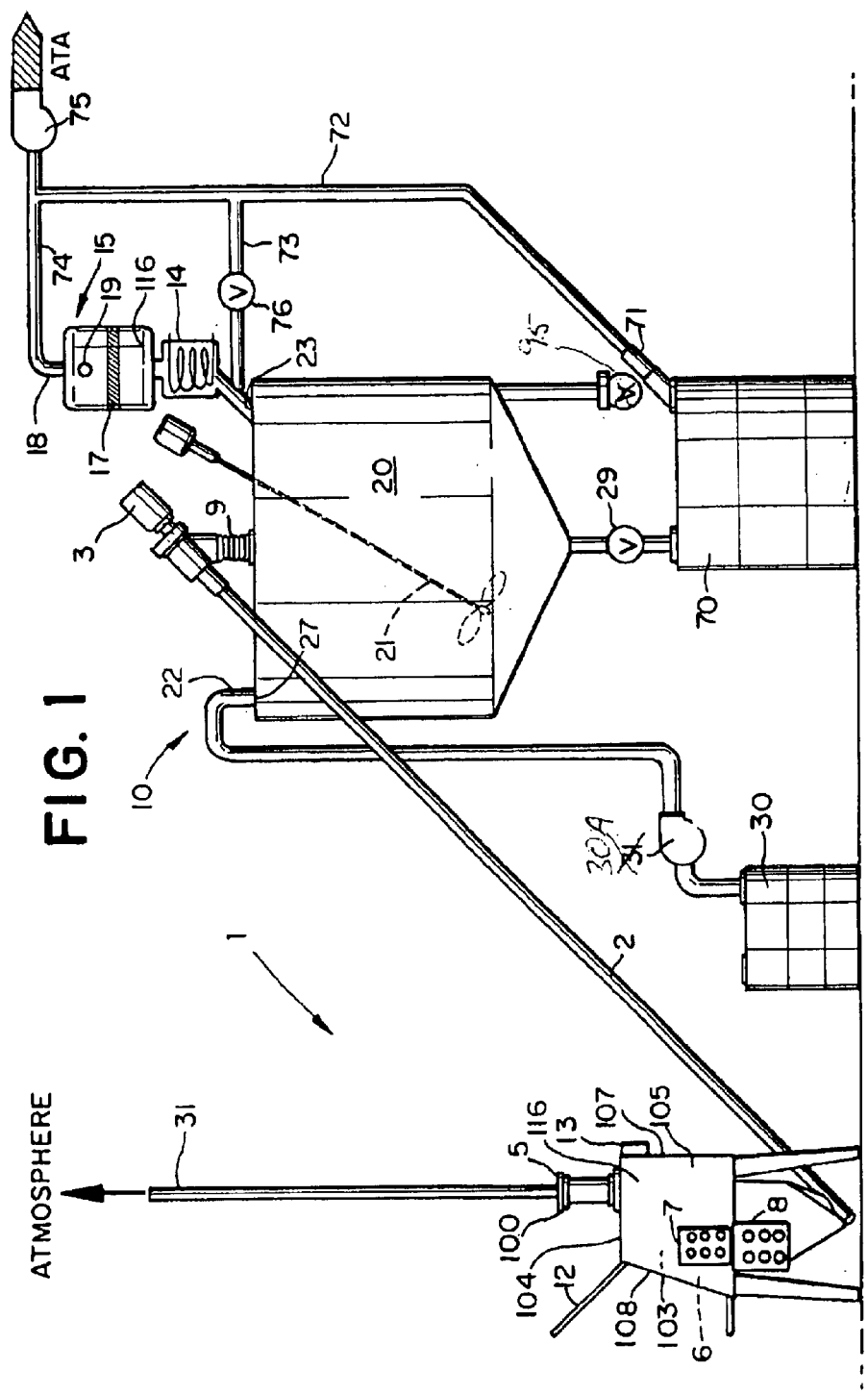
FIG. 1 is a somewhat diagrammatic sectional side elevational view of a blending apparatus in accordance until the invention.

Referring more particularly to the drawings, wherein like reference numerals represent similar elements throughout the views.

The illustrated apparatus 10 as shown in FIG. 1 is a simplified version of the present invention which includes three basic filtering components or systems which when operated in concert provide an apparatus and method for safely blending toxic materials. These components comprise a closed mixing system and filtering means for discharging vapors from the apparatus into the atmosphere. Such vapors have air quality levels exceeding federal and state requirements. The venting means includes separate and distinct filtering systems comprising a first filtering means for the supply means and a second filtering means for the mixing vessel. The vapors may be discharged to the atmosphere independently from each system or combined by being connected to a common exhaust line.

Figure 2:
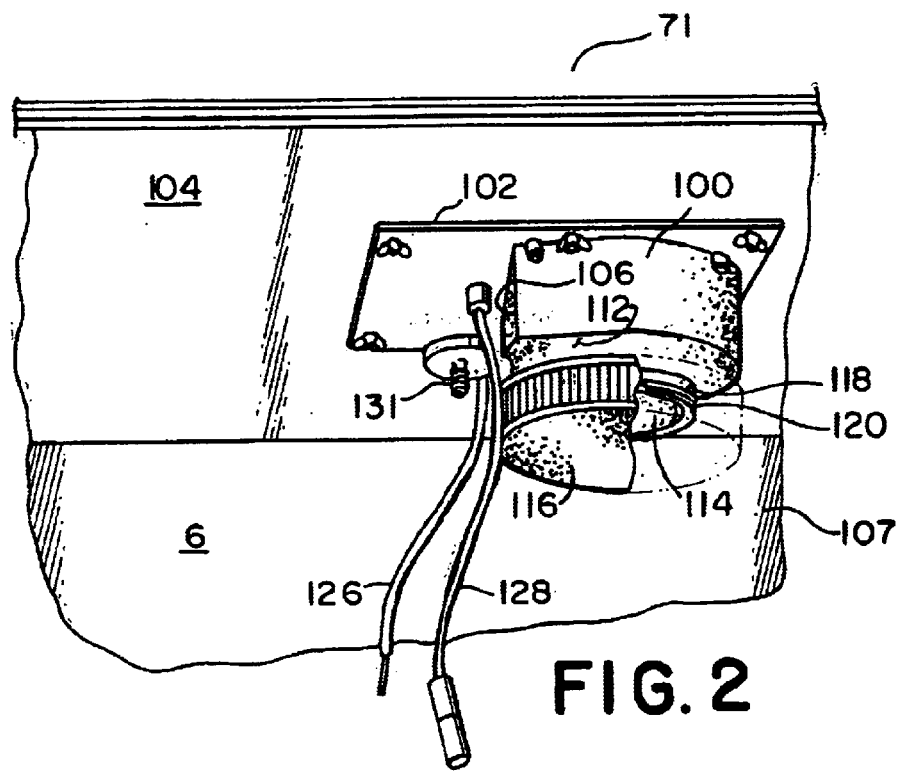
FIG. 2 is a fragmented perspective view showing the blower assembly at the top of the chamber with an upper plenum-defining plate removed for clarity in accordance with the invention.

Generally, the closed supply means is in form of a conveyor conduit assembly 1 which comprises a hopper device 5 and a helix conveyor 2 which is a helical screw feeder that is enclosed by a tube. The helix conveyor 2 charges a solid solute into the mixing vessel 20, from hopper device 5. The hopper device 5 has a chamber 6 formed by left side 103, right side 105, top side 104, rear side 107 and a front side 108 with an opening. An outer door 12 is pivotally mounted to the front side 108 to allow access for loading the solid solute into the hopper device 5 and to seal chamber 6 when in use. The hopper device houses the first filtering means which includes a blower assembly 100 having a high efficiency particle adsorber (HEPA) filter. The blower assembly 100 (as shown in FIG. 2) is mounted to the underside of top side 104 and is in fluid communication with a first filtering means for exhausting hopper device 5 such as vent line 31. A pneumatic accumulator 13 which stores air to pulse the environment of chamber 6 to clean filters is installed on the blower assembly 100. A control box 7 which contains a microprocessor is connected to and controls the variable speed electric motor 3 which rotates the screw feeder of the conveyor conduit assembly 1. A panel 8 controls diverter valves which direct the transfer of solid solute material through discharge means through supply line 2 to a suitable mixing vessel such as a mixing tank 20 with exhaust motor 9. Panel 8 also houses the controls for pump 30A which provides for the flow of solvent from the liquid supply means 30 through the supply line 22 into the container 20. The electrical control hardware components of the present system, i.e., control box 7 and panel 8 may be operated in an automatic mode or in a manual mode.

The electrical control systems for the blending apparatus may be effected manually from the control box 7 and panel 8 attached to hopper 5, or by manually activating individual components such as, pumps, mixers, etc., or preferably by a microprocessor located at a remote site, e.g. a control room. A microprocessor received data from sensors and a number of other sources and can monitor and control the rates of rotation of the screw feeder 2, the vessel mixer, the blower 100, the pneumatic accumulator 13 and exhaust fan of the venting system.

The microprocessor (not shown) can produce displays on a character display on the front of the unit, and is able to receive commands from an operator through keystrokes on a keyboard located adjacent to the display. The display and keyboard form an interface through which the microprocessor can be controlled by an operator. Thus, the operator can set the various process parameters including operatively connecting these conditions to activate an alarm system if any critical set range is exceeded.

The suitable container 20 is a vessel or tank equipped with a static mixer 21 such as an agitator driven by an electric motor 3 and has an inlet port 27, an outlet valve 28 and a vent port 23. The inlet port 27 is in fluid communication with pump 31 to supply the liquid solvent into the mixing vessel 20. Vent port 23 is connected to the demister 15 preferably through a water cooled condenser 14 which is interposed between the mixing vessel 20 and the demister 15. The demister 15 is vented through vent line 74, through exhaust fan 75 and then to the atmosphere. The mixing vessel rests on four load cells as represented by load cell 92. The load cells are stainless steel strain gauges that measure the weight in the vessel. If the load cells indicate that a weight limit parameters on readout 90 has been exceeded, the preprogrammed microprocessor will signal the pumps to stop and activate an alarm system.

After the mixing operation is completed, valve 29 is opened to fill drum 70. Any fill emissions are captured by the hooded nozzle 71 and passed through line 72 to the exhaust fan 75. Alternatively the emissions may be directed to the demister through line 73 and the open valve 76.

Preferably, all components of the apparatus are manufactured from corrosion resistant materials. Such corrosion resistant metals, most preferable include stainless steel or an engineering plastic including high density polyethylene, polypropylene, acrylonitrile-butadiene-styrene (ABS) resins, acrylic polymers, Nylon 66, acetal resins, phenolic resins, e.g., phenol-formaldehyde, urea-formaldehyde, melamine-formaldehyde, epoxy resins and polycarbonates.

The conveyor conduit assembly 2 comprises a screw feeder preferably constructed of high density polyethylene. The connecting lines and pumps are preferable made from polypropylene.

The apparatus is primarily designed to process toxic or irritating materials and is clearly directed to providing operator safety and to avoid environmental sensitivities. The apparatus is particularly useful if dust and/or vapors evolve upon handling or blending of the solute and solvent due to an exothermic reaction. The filtering systems in accordance with the operation of the apparatus provides a control of the toxic materials from entering the workplace and allows recovery of substantially all the components and products of the blending operation. The combination filtering system which is the crux of this invention comprises a HEPA filter component 116 which is positioned on the inlet of the blower assembly 100 and at least on the demister device 15 and located between mixing vessel vent line 23 and exhaust line 74.

The structure of the blower assembly 100 is shown in more detail in FIG. 2. The HEPA filter component of the unique combination venting system of the present invention includes a blower assembly 100 which is mounted to a plate 102 as an underside of the top side 104 of the chamber 6 of hopper 5. Mounting plate 102 is fastened to an upper panel 104 of chamber 6. As appreciated from FIG. 2, an outlet 106 of blower assembly 100 is situated through the upper panel 104 in fluid communication with an exhaust line 18. A HEPA filter 116 is attached to inlet 114 and mounted to a cylindrical extension 118 defining inlet 114 of blower assembly 100. Extension 118 including an O-ring seal 120 for sealing the removable connection made between HEPA filter 116 may be easily removed and replaced from within chamber 6. Preferably extending from plate 102 are a temperature probe 126 and a humidity sensor 128 which may be connected to other electrical control box 7 or at a remote site. A HEPA filter sample port 131 may also be mounted to plate 102 for drawing test samples of air from the chamber 6. When the blower assembly 100 is activated to control the solute dust, the HEPA filter 116 controls the amount of ambient air being drawn in and ensures a continuous gentle airflow throughout the entire hopper 5. Preferably, a HEPA filter having a flow rate of 1/10 CFM (cubic feet per minute) is used, which is 99.99% efficient of 0.3 micron particulates, the filter traps the particulates and prevents their escape. Thus, the ambient air from hopper 5 may be exhausted to the atmosphere through exhaust line 71 which is in fluid communication with blower assembly 100, without compromising any environmental air quality standards. If it is determined by the analysis of the air within the chamber 6 or by the reduction of the flow rate of the ambient air through the blower assembly 100 that the adsorbed dust particles have clogged the HEPA filter 116 an air pulse is released. The pneumatic accumulator 13 stores air to pulse the HEPA filter to dislodge the adsorbed particulates which drop back into the hopper 5 so that no solute is lost.

Since humidity and temperature have a pronounced effect on solute solids, it is preferred that these conditions be controlled. The HEPA filters should be maintained at temperatures above the dew point of the air mixture within the chamber 6 to prevent condensation from developing inside the filter. This condensation can restrict or block the flow of air through the filter, in a preferred embodiment a heat source (not shown) is available to maintain a desired temperature range. The heat source may be an air heater remote from the chamber with the hot air transferred into chamber 6. The temperature control is in direct connection with temperature sensor 126 or humidity sensor 128.

The other important component of the combination filtering system of this apparatus is having one or more demister (mist eliminator) devices 15 which is in fluid communication with the venting means of a mixing vessel or a plurality of mixing vessels. As shown in FIG. 1, the mixing vessel exhaust line 20 is connected to the demister device 15 through mixing vessel exhaust line 23 and then vented to the atmosphere through exhaust line 74 drawn by exhaust fan 75. The cylindrical portion of the demister device 15 may be manufactured from corrosion resistant thermosetting resins, described above. The cylinder may be of an integral construction or it may be sectional, i.e., removable top, bottom or half sections. Preferably, the cylindrical vessel is made from a high density linear polyethylene.

Figure 3:
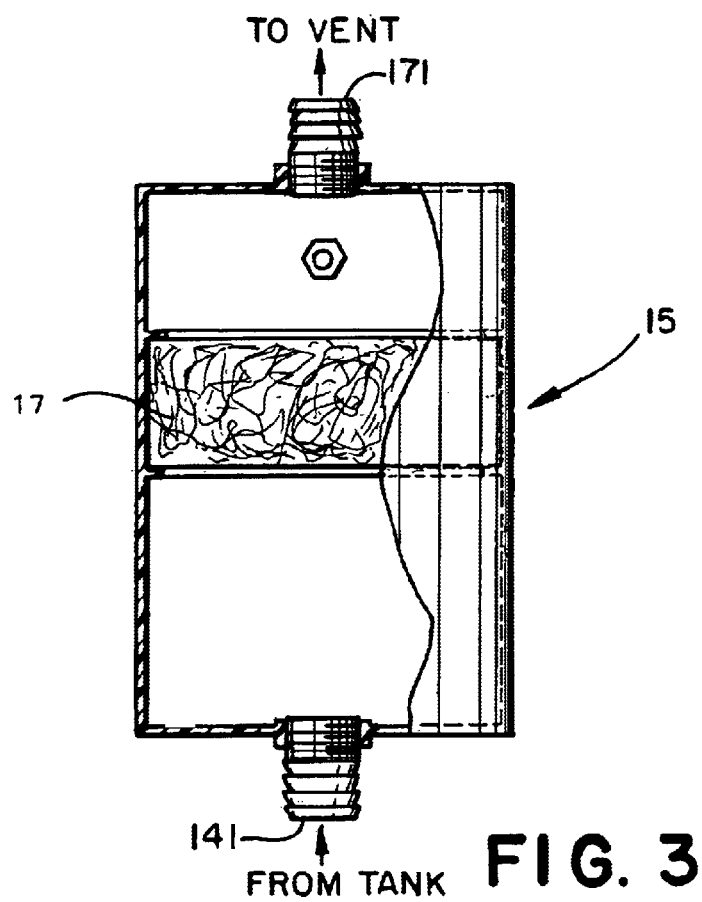
FIG. 3 is a partial cross-sectional view of a demister used in the apparatus of the invention.

As shown in FIGS. 2 and 3, an adsorbant desmister mesh pad 17 is positioned in the upper half of the cylinder, occupying about ten percent of the cylinder volume and is spaced from the outlet port 171. The demister 15 has an inlet port 141 which preferable is in fluid communication with a heat exchanger (as shown in FIG. 1). The condenser 14, typically made of stainless steel improves the efficiency of the demister by cooling and condensing the vapor entrained in the tank exhaust vapors. The pad 17 is constructed of a corrosion resistant mesh material including stainless steel or synthetic fibers selected from polyester, polyfluorocarbon, polyolefin and polyurethane fibers. The mesh pad 17 should have a flow rate of between about 1075 to 1290 cubic feet per minute. The demister device 15 has a fitting 19 to measure the flow rate of the exhaust stream passing through the device. The mesh pad can be regenerated by reverse flushing of solvent or can be replaced, if the sectional mist eliminator is used.

In accordance with this invention in its basic aspects as illustrated by FIG. 1, a required amount of a solvent is measured by the load cell system as supplied to the mixing vessel 20. it is preferred that these conditions be controlled. The HEPA filters should be maintained at temperatures above the dew point of the air mixture within the chamber 6 to prevent condensation from developing inside the filter. This condensation can restrict or block the flow of air through the filter. In a preferred embodiment a heat source (not shown) is available to maintain a desired temperature range. The heat source may be an air heater remote from the chamber with the hot air transferred into chamber 6. The temperature control is in direct connection with temperature sensor 126.

Humidity sensor 128 is as important as temperature control since high humidity may cause the solid solute particles or powders to coalesce making handling and blending more difficult. The humidity can be reduced by raising the temperature of the chamber. Therefore, a closed loop temperature-humidity control may be employed, i.e., the same heat source may be activated by either the temperature 126 or humidity sensor 128.

The other important component of the combination filtering system of this apparatus is having at least one (demister eliminator) device 15 which is in fluid communication with the venting means of a mixing vessel or a plurality of mixing vessels. As shown in FIG. 1, the mixing vessel 20 is connected to the demister device 15 and solvent may be supplied to mixing vessel 20 by activating diaphragm pump 31 or by a gravity feed through solvent inlet line 22 from a solvent supply means such as a drum 30. Pump 31 may be programmed by a microprocessor means, or remotely by other electrical means or manually activated by suitable controls located on panel 8 or by an individual switch located on the pump. A solute generally in a solid state, such as in crystal, flake, granulated, or powdered form is manually loaded into hopper device 5. A first supply of a granulated material is deposited to prime the screw feeder. The solute charge may in turn be automatically supplied from an auxiliary feeder such as a bulk bag unloader (not shown). The solid material is controllably conveyed by the rotation of screw feeder through conveyor conduit assembly 2 to charge the mixing vessel 20 containing agitated solvent.

After dissolution of the solute, the mixing is continued for a suitable period to ensure that all the solute has been dissolved, the product is emptied by opening from the mixing vessel 20 to a loading zone occupied by drum 70. Any vapors which might evolve from the filling operation are trapped by a hooded nozzle 71 which is attached to vent line 72. As shown in FIG. 1 vent line 72 can be exhausted directly through vent line 74 through exhaust fan 75.

Figure 4:
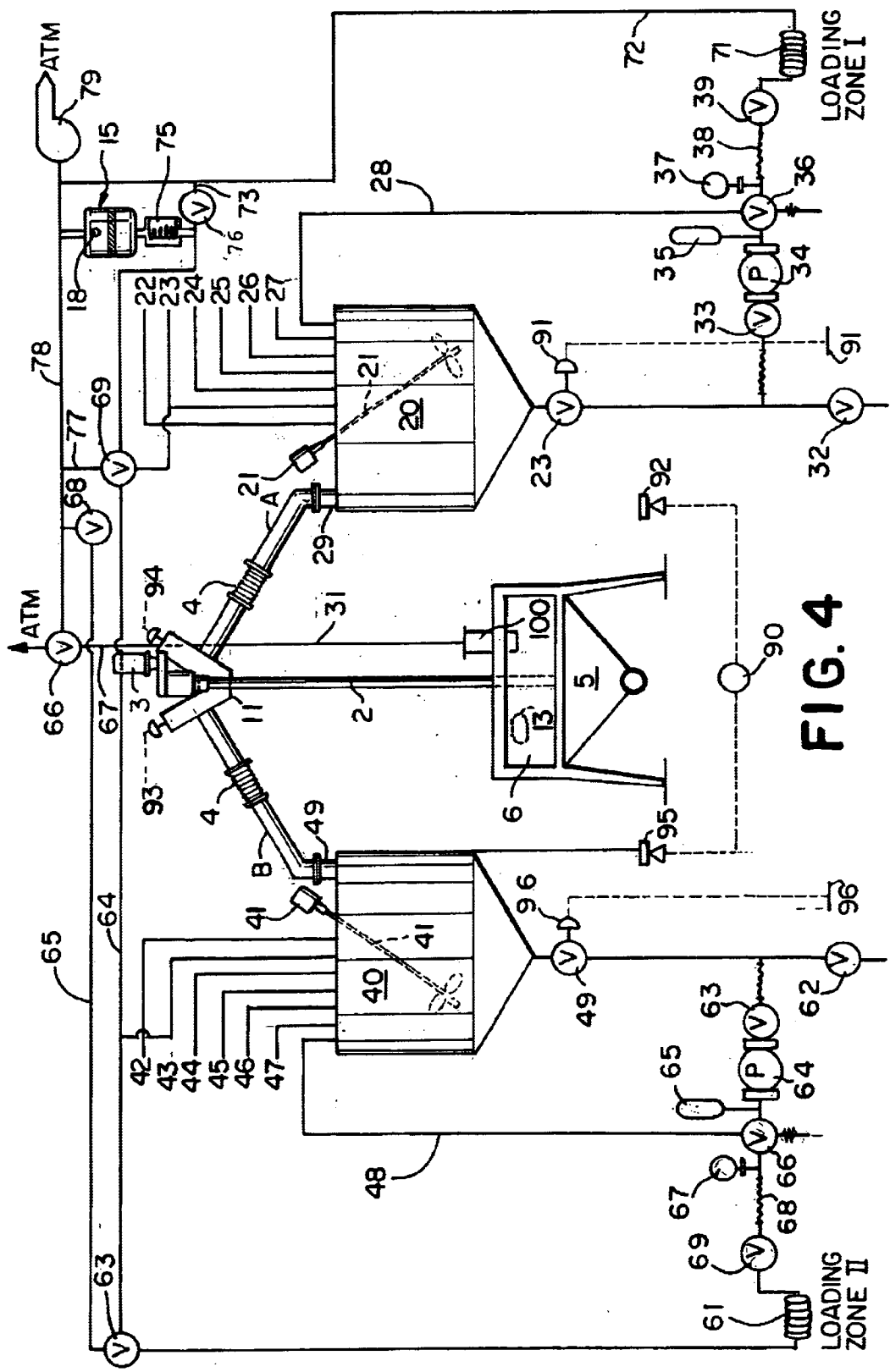
FIG. 4 is a somewhat diagrammatic sectional view of the blending apparatus in accordance with this invention incorporating multiple mixing tanks.

In a particularly preferred embodiment, the blending of catechol (CAT) and mono ethanolamine (MEA) was carried out in the apparatus 50 of the invention as shown in FIG. 4. This embodiment illustrates the present invention in an industrial plant operation. The plant set-up involves apparatus 50 having two identical units equipped with the same components functioning in the same manner. This allows for a continuous operation by closing a 1¼ inch solution product valve 39 and drain valve 32. Then solenoid switch 94 is engaged to close a 2 inch polypropylene diaphragm valve 29 on a 1650 gallon conical-bottomed polyethylene vessel 20 equipped with agitator 21. About 13,045 pounds of MEA was charged through a 32 milliliter addition line 27 into mixing vessel 20 by pump 34 from a solvent storage means (not shown) and monitored by load cells 95. Load cell 95 is one of four stainless steel strain gauges to measure weight of solvent in the mixing vessel 20. Load cell readout 90 transduces strain gauge measurement and provides a digital readout which may be electrically connected to a microprocessor and displayed on its monitor. The alarm systems are connected to the mixing vessel 20 through line 24 and may be either positioned proximately or remotely. The alarm mechanism may be selected from an audio signal such as a klaxon, buzzer or tuning fork or a visual signal such as a flashing light, i.e. strobe light.

Other access points to the mixing vessel 20 is afforded by manway 22, an inlet for a spray or cleaning ball 25, a spare line 26 and a recirculation line 28. All are located at the top of the mixing vessel 20 and except for the manway opening have flexible connections. Flexible plastic pipe connections allows for movement for the mixing vessel so the load cells can determine the accurate weight of the solvent added. The manway 22 is a 16 inch opening and allows for inspection of the interior of the vessel. Insert 25 allows for a TEFLON® spray ball to be inserted to clean the interior of the vessel.

After filling the mixing vessel to the weight indicated above, the agitator 21 was activated. Air diaphragm pump inlet valve 33 was opened and air diaphragm pump 34 was started to recirculate a portion of the charged solvent through loop 28. Loop 28 includes a surge suppressor 35 which dampens the pulsations or air diaphragm pump or air which may be trapped within the loop and a relief valve 36 set at 30 psi and positioned along solution product line 38. Air diaphragm pump 34 is a 1½ inch polypropylene/EPDM plastic which in addition to providing the pressure for recirculation also provides the pressure to move the product solution to the loading zone along line 39. Line 38 is equipped with a pressure gauge and an isolator. The isolator prevents the solution product from contacting the pressure gauge internal mechanism and indicates the air diaphragm pressure.

The pneumatically-operated stainless steel diverter valve 11 was activated by solenoid switch 94 to direct the CAT charge from the screw-feeder to the supply chute A. Each supply chute, i.e., chute A and chute B has a 6 inch EPDM expansion joint which absorbs the vibrations generated by the conveyor conduit assembly 2 and the agitator 3, as well as, compensating for the movement of the mixing vessel due to variations in weight loadings.

The next step involves energizing the 2 horsepower motor of blower assembly 100. The blower assembly removes CAT dust and provides differential pressure across the HEPA filters to vent line 71. A partial charge of CAT, i.e., about 200 pounds is added to an 8 cubic foot stainless steel hopper device 5 to prime the screw feeder. The feed screw was started and the remainder of the CAT charge of about 800 pounds is loaded and the hopper door 12 is closed to seal the hopper chamber 6 (FIG. 1). The screw-feeder was activated and the revolutions were controlled by the variable speed motor so that the CAT added to the mixing vessel does not exceed 100 pounds per minute. After the addition of all the CAT solute, the helix conveyor was stopped and the blower motor continues running while the residual CAT was placed into the hopper. Then the hopper 5 is closed and the blower assembly motor turned off. The MEA/CAT blend is agitated and recirculated after total dissolution for about an hour.

The dissolution of CAT into MEA generates an exotherm which causes some volatility of MEA and the MEA/CAT solution product. The overhead vaporous products so generated exit the mixing vessel 20 through a 3 inch vent line 23 and are directed through a 3 inch inlet port 141 of a demister 15 (FIG.3). The demister comprises a 30 gallon high density linear propylene tank which reduces MEA/CAT exhaust velocity provides disengagement volume for liquid droplets formed on a polypropylene mesh pad, and provides support for the pad. The mesh pad removes droplets from the MEA/CAT vent exhaust stream by the mechanisms of interception and impaction. The vaporous products exist the demister, pass through outlet vent 171 and are drawn through the demister by exhaust fan 75. In the demister the vaporous products were deliquified, thus detoxified and discharged to the atmosphere.

In a preferred embodiment a condenser 14 (FIG. 1) is interposed between the vent line 73 of the mixing vessel and the inlet port 141 of the demister. As pointed out earlier, the condenser improves the liquid removal efficiency of the demister device.

Upon completion of the extended agitation, and the relief valve 36 present at 30 psig, the diaphragm valve 29 on the bottom of the mixing vessel is opened by solenoid switch 91 and 96 (FIG. 4) and a 1¼ inch control valve 39 on solution product outlet line 38 is opened to control the flow of product into a drum or storage (not shown). A 4 inch hooded nozzle 71 (61 in FIG. 4) traps vapors from the filling operation and directs them through vent line 72 directly to the atmosphere or they may be diverted to vent line 73 through valve 76 (FIG. 1) passing through demister 15 then to vent line 74 drawn by exhaust fan 75, de-qualified, thus, detoxified, and discharged to the atmosphere.

Concurrent with the agitation step in mixing vessel 20, the blending operation may be started in mixing vessel 40, in the same sequence disclosed. Of course, the diverter valve's position is changed by solenoid valve 93 to direct the flow of CAT into supply chute B to charge mixing vessel 40. The equivalent components relative to mixing vessel 40 and mixing vessel 20 which function in the same manner as illustrated in FIG. 4.

In the apparatus there is provided pups 34, 64, and surge suppressors 35, 65 to maintain a speedy flow and even flow throughout the lines which includes pressure sensors 37, 67. The lines include pressure relief valves 36, 66. The valves 32 and 62 are dump valves for removing product. Valves 63, 69 and 74 and diverter valves controllable by a microprocessor to divert the gases and fumes.

Each of the mixing vessels 20, 40 are provided with vents 23, 43, a high level alarm and strobe 24, 44 which sense high liquid levels and flash a strobe alert. A Teflon spray ball 25, 45 cleans the interior of the tank and a spare nozzle 26, 46 is provided for miscellaneous use. The solvent is added through nozzles 27, 47. Mainways 22, 42 allow for inspection of the vessels 20, 40.

As will be apparent to those skilled in the art in the light of the foregoing disclosure, many alteration and modifications are possible in the practice of this invention without departing from the spirit or scope thereof. While the blending process in the foregoing disclosure describes the preparation of a MEA/CAT solution product, the invention method is expected to a wide variety of other solvent-solute combinations as shown in Table II below.

TABLE II

| Solute | Solvent |
| --- | --- |
| Benzotriazole (s) | N methylethanolamine |
| Gallic Acid (s) | N methylethanolamine |
| Ammonium acetate (s) | Propylene glycol |
| All of the above | Water |

Furthermore, those skilled in the art would know how to modify certain components of the apparatus to handle more corrosive systems. For example, the combinations of solvent-solute shown in Table III would require stainless steel components, i.e., hopper, mixing vessel and piping.

TABLE III

| Solute | Solvent |
| --- | --- |
| Hydroxyquinoline (s) | N,N-dimethylacetamide |
| Ammonium acetate (s) | N,N-dimethylacetamide |

Numerous other modification changes, variations, substitutions and equivalents will occur to those skilled in the art without department from the spirit and scope of the present invention as defined by the appended claims.

What is claimed is:

1. An apparatus for blending a hazardous solute and a volatile solvent at atmospheric pressure to form a solution product which substantially reduces starting material and product operational loss while improving environment safety, said apparatus comprising:
    a) a closed conveyor for supplying by gravity feed a predetermined amount of solute to a closed vessel; said closed conveyor including a hopper means in combination with a helix conveyor, said hopper means having a chamber, said chamber including a humidity control means and a blower assembly mounted within the chamber, said blower assembly having an inlet means with at least one particulate air filter for controlling air flow throughout said hopper means connected with a hopper vent in fluid communication with a first vent means for exhaust to the atmosphere, and a pneumatic accumulator operatively connected to the blower assembly for pulsing air through said filter to clean said filter and move product through said apparatus;
    b) a means for transferring a predetermined amount of solvent into the closed vessel, said closed vessel adapted for holding the solvent and the solute and having at least one inlet means at the top of said closed vessel for introducing solvent into said vessel, a mixing means, at least one outlet means for discharging solution product, and a vessel vent which is in fluid communication with a demister device, said closed vessel having means for measuring the weight in said vessel; said demister device being associated with said closed vessel at its top and in fluid communication with a second vent means for exhaust to the atmosphere, said demister device for adsorption of entrained droplets of solvent and solution product; and
    c) a means at the bottom of said closed vessel for transferring solution product from said closed vessel.

2. The apparatus according to claim 1 wherein said filter is efficient for filtering 0.3 micron and greater particulates.

3. The apparatus according to claim 1 having a heat exchanger in communication and interposed between said second vent means and the demister.

4. The apparatus according to claim 3 wherein said heat exchanger is a water cooled condenser.

5. The apparatus according to claim 1 including a heater in thermal communication with said humidity control means for controlling the percentage of humidity in the chamber.

6. The apparatus according to claim 1 wherein said demister has a velocity control means and has an adsorbent mesh pad positioned in the upper half of the demister and occupying about 10 percent of its volume.

7. A method for blending a hazardous solute and a volatile solvent at atmospheric pressure to form a solution product which substantially reduces starting material and product operational loss while improving environment safety, said method comprises the steps of:
    a) introducing a predetermined amount of a solvent by gravity feed into the top of a closed mixing vessel, said mixing vessel having at least one inlet means at its top for introducing solvent into said vessel, a mixing means, at least one outlet means for discharging solution product, at least one vent means at its top in fluid communication with at least one demister device, and a means for measuring the weight in said vessel at its bottom;
    b) agitating said solvent with said mixing means;
    c) charging a predetermined amount of a solute by gravity feed into the top of said vessel with a closed conveyor, said closed conveyor including a hopper means in combination with a helix conveyor, said hopper means having a chamber, said chamber including a humidity control means and a blower assembly mounted within the chamber, said blower assembly having an inlet means with at least one particulate air filter for controlling air flow throughout said hopper means connected with a hopper vent in fluid communication with a first vent means for exhaust to the atmosphere, and a pneumatic accumulator operatively connected to the blower assembly for pulsing air through said filter to clean said filter and move product through said apparatus;
    d) weighing said mixing vessel with said means for measuring the weight in said vessel and signaling when the weight limit parameters have been exceeded;
    e) pulsing air into said chamber with said pneumatic accumulator;
    f) dissolving said solute into said solvent to form a solution product and an overhead vapor including entrained solvent and solution product substances;
    g) controlling the humidity and air pressure within said mixing vessel with said humidity control means and said blower assembly;
    h) exhausting said overhead vapor through said at least one vent means at the top of the mixing vessel to said at least one demister device;
    i) passing said overhead vapor through said at least one demister device to form a treated vapor, said at least one demister device removing the entrained solvent and solution product substances from the overhead vapor, forming droplets and returning said droplets back to said mixing vessel;
    j) discharging the treated vapor to the atmosphere; and
    k) transferring the solution product from the bottom of the mixing vessel through said at least one outlet means.

8. The method of claim 7 wherein the solute is catechol and the solvent is selected from the group consisting of monoethanolamine and dimethylsulfoxide.

9. The method of claim 7 wherein the solute:solvent combination is selected from the group consisting of catechol:ethanolamine, catechol:dimethylsulfoxide, benzotriazole:N-methylethanolamine, gallic acid:N-methyl ethanolamine, ammonium acetate:N,N-dimethylacetamide, 8-hydroxyguinoline:N,N-dimethylacetamide, benzotriazole:water, and ammonium acetate:water.

10. The method of claim 7 including means for controlling air in said mixing vessel.

* * * * *